United States Patent [19]
Okada

[11] 3,730,136
[45] May 1, 1973

[54] CONSUMABLE ELECTRODE ARC WELDING MACHINE

[75] Inventor: Toshihiko Okada, Osaka-fu, Japan

[73] Assignee: Osaka Transformer Co., Ltd., Osaka-shi, Osaka-fu, Japan

[22] Filed: Sept. 16, 1970

[21] Appl. No.: 72,598

[30] Foreign Application Priority Data

Sept. 16, 1969 Japan..............................44/72741

[52] U.S. Cl......................118/78, 184/15 R, 219/130
[51] Int. Cl...............................................B05c 11/00
[58] Field of Search..........................118/76, 77, 78; 184/99, 15 R; 33/87; 191/55; 219/130; 314/136; 72/41–44; 101/DIG. 16

[56] References Cited

UNITED STATES PATENTS

| | | | |
|---|---|---|---|
| 151,108 | 5/1874 | Evans | 184/99 |
| 282,837 | 8/1883 | Brinkerhoff | 184/99 |
| 686,461 | 11/1901 | Keats | 118/78 |
| 990,637 | 4/1911 | Dawson | 184/99 U X |
| 1,308,385 | 7/1919 | Weiss | 118/77 |
| 1,694,153 | 12/1928 | Watres | 184/99 X |
| 2,434,861 | 1/1948 | Pachner | 33/87 X |
| 2,477,422 | 7/1949 | Roseman | 118/78 X |
| 2,819,384 | 1/1958 | Cornell, Jr. | 219/130 |
| 3,027,974 | 4/1962 | Allen | 184/99 |
| 3,056,102 | 9/1062 | Cornell, Jr. | 219/130 X |

FOREIGN PATENTS OR APPLICATIONS

| | | | |
|---|---|---|---|
| 394,205 | 11/1908 | France | 118/77 |

*Primary Examiner*—Morris Kaplan
*Attorney*—Craig and Antonelli

[57] ABSTRACT

A electrode wire feeding device adapted for use in a consumable electrode arc welding machine, wherein the wire feeding device is provided with a lubricant feeder for effecting a smooth movement of such wire in a length of hollow guide tubing connecting between said feeding device and a suitable welding torch. In the lubricant feeder, a solid lubricant is employed which can be finely pulverized under friction in contact with the moving wire, whereby the frictional resistance between the wire and the hollow guide tubing can be substantially reduced.

11 Claims, 19 Drawing Figures

Patented May 1, 1973  3,730,136

INVENTOR
TOSHIHIKO OKADA
BY Craig, Antonelli,
Stewart & Hill
ATTORNEYS

Patented May 1, 1973

INVENTOR
TOSHIHIKO OKADA
BY Craig, Antonelli,
Stewart & Hill
ATTORNEYS

CONSUMABLE ELECTRODE ARC WELDING MACHINE

BACKGROUND OF THE INVENTION

The present invention relates to a consumable electrode arc welding machine and, more particularly, to an improvement in an electrode wire feeding device adapted for use in the welding machine, wherein the electrode wire feeding device is provided with a lubricant feeder by which a length of electrode wire passing through a hollow guide tube is imparted with a lubricant prior to entering the hollow guide tube so as to permit the smooth movement of the electrode wire within the hollow guide tube with substantial reduction of friction between the peripheral surface of the wire and the inner peripheral surface of the guide tube.

In automatic or semi-automatic arc welding, it has been well known that the electrode wire continuously fed by means of an electrode wire feeding device is guided through the guide tube with its leading tip directed toward a weld. In general, the conventional wire feeding device is merely composed of a feeder roller rotatable by a drive means and a pinch roller positioned opposite to the feeder roller whereby a length of electrode wire is drawn from a supply reel on to the weld through the guide tube while sandwiched between the feeder roller and the pinch roller.

In this instance, the motor which has been employed in the drive means for rotating the feeder roller, i.d., for feeding the electrode wire from the supply reel on to the weld, should have a sufficient capacity enough to draw the electrode wire from the supply reel against the frictional resistance inherent between the peripheral surface of said wire and the inner peripheral surface of the guide tube as the electrode wire is fed therethrough. Accordingly, this may result in the increase of the total weight and overall size of the conventional welding machine assembly with necessitating complicated handling procedures.

Furthermore, in the conventional semi-automatic arc welding such as wherein the electrode wire is fed through the guide tube which is long and flexible, it has been well known that the electrode wire cannot be smoothly fed on to the weld even if a drive motor of relatively great capacity is employed in the electrode wire feeding device. Accordingly, the arc that has been established cannot be maintained in the stably established condition and, in an extreme case, maintenance of the arc throughout the welding operation cannot be achieved without any difficulties.

In order to overcome the abovementioned defects, the provision has been heretofore proposed wherein the guide tube is formed with at least one hole communicating the inner hollow of the guide tube to the exterior, through which hole a powdery lubricant such as of molybdenum disulfide is supplied into a clearance between the peripheral surface of the electrode wire within the inner hollow and the inner peripheral surface of the guide tube in order to reduce the frictional resistance therebetween. In this instance, it has been encountered that the constant supply of a predetermined amount of a powdery lubricant for uniformly sticking the latter around the electrode wire extending through the guide tube can not be achieved without any difficulties. Nevertheless, it often occurs that a relatively large amount of the powdery lubricant is stuck to local portion of the electrode wire over the entire length thereof and/or piled up within the hollow guide tube. Such lack of uniformity in the amount of supply of the powdery lubricant will result in the smooth movement of the electrode wire through the guide tube and/or the conduction of electrid welding current through the electrode wire being hampered. In addition, so long as the powdery lubricant is apt to stick to the local portions of the electrode wire as hereinbefore described, the frictional resistance of relatively large value cannot be satisfactorily reduced at portions other than that local portions, merely resulting in waste of the lubricant.

SUMMARY OF THE INVENTION

Accordingly, one object of the present invention is to provide an improved electrode wire feeding device wherein a lubricant feeder means is provided for uniformly supplying a predetermined amount of lubricant to at least a semi-circular portion of the peripheral surface of the electrode wire over the entire length of the wire whereby the smooth movement of the wire through the guide tube can be ensured with substantial reduction of the frictional resistance.

Another object of the present invention is to provide an improved electrode wire feeding device wherein the lubricant feeder means employs a solid lubricant made of graphite, molybdenum or a mixture of these compounds coagulated into a rod or bar shape with the use of a binder.

According to the present invention, the lubricant feeder means is positioned between an electrode wire drawing mechanism and the adjacent end of the guide tube in such a manner that the lubricant is contacted at its one end with the electrode wire while pressure is imposed on the other end of the lubricant. Accordingly, as the electrode wire is moved in the guide tube in the direction of a weld to be formed, the solid lubricant in contact with the electrode wire wears away under friction at a constant rate to produce pulverized lubricant covering at least a semi-circular portion of the peripheral surface of the electrode wire whereby the smooth movement of the electrode wire within the guide tube can be ensured throughout the welding operation.

In other words, the amount of lubricant to be worn away, i.e., the amount of lubricant to be supplied over the electrode wire, can be automatically regulated according to a value of the feeding speed of the electrode wire. Alternatively, such amount of the lubricant can be also regulated according to the value of the contact pressure generated at the contact surfaces between the solid lubricant and the electrode wire. If this contact pressure is intensified, such amount will increase and, if lessened, such amount will be reduced.

A further object of the present invention is to provide an improved electrode wire feeding device having the lubricant feeding means wherein means for adjusting the value of the contact pressure between the solid lubricant and the electrode wire is provided for maintenance of the pressure at the predetermined value whereby the amount of lubricant to be supplied over the electrode wire can be advantageously regulated irrespective of the size and weight of the solid lubricant to be employed.

By achieving this object, reduction of the contact pressure incident to the wear of the lubricant which will result in the reduction of the amount of supply of the lubricant can be eliminated.

A still further object of the present invention is to provide an improved electrode wire feeding device having a lubricant feeding means wherein a disengaging means for temporarily maintaining the solid lubricant clear of the contact with the electrode wire is provided whereby, when the electrode wire is to be replaced with a new one, such replacement procedure can be easily performed without being hampered by the lubricant.

BRIEF DESCRIPTION OF THE DRAWING

These and other objects of the present invention will either be pointed out or will become apparent from the following description taken in conjunction with the preferred embodiments thereof shown in the accompanying drawings, in which.

DETAILED DESCRIPTION OF THE DRAWING

Figure 1:
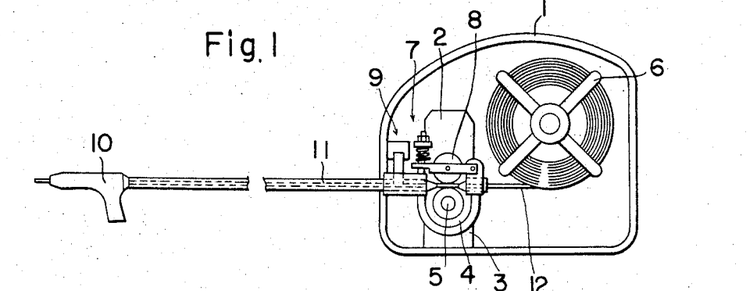
FIG. 1 is a schematic side view layout of an electrode wire feeding device adapted for use in a semi-automatic consumable electrode arc welding machine according to the present invention.

Referring now to the drawing and, in particular, to FIG. 1, the electrode wire feeding device is adapted for use in a consumable electrode arc welding machine according to the present invention, and reference numeral 1 represents a housing accommodating therein a drive motor unit 2, a reduction gear unit 3 associated with the motor unit 2, an electrode wire supply reel 6, an electrode wire drawing mechanism 7 having a pinch roller 8 and a feeder roller 4 rotatably mounted on an output shaft 5 extending from the reduction gear unit 3, and a lubricant feeder 9. Reference numeral 10 represents a welding torch, and reference numeral 11 represents a length of guide tube extending between the housing 1 and the welding torch 10 for guiding therethrough an electrode wire 12 supplied from the supply reel 6 on to the welding torch 10.

The electrode wire 12 is adapted to be drawn from the supply reel 6 by means of the feeder roller 4 while sandwiched between the roller 4 and the pinch roller 8 and extended through the guide tube 11 with its leading tip projecting from the welding torch 10 towards a weld (not shown) whereby, as the electrode wire 12 is consumed by arcing, it can be continuously supplied from the supply reel 6 by means of the electrode wire drawing mechanism 7.

Figure 2:
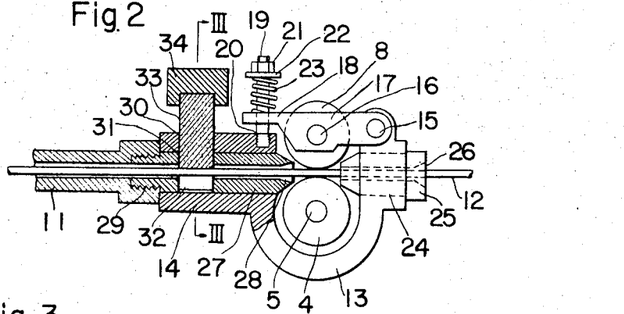
FIG. 2 is a side view on an enlarged scale, of a portion of the electrode wire feeding device having a lubricant feeder unit and a electrode wire drawing unit shown in FIG. 1.
Figure 3:
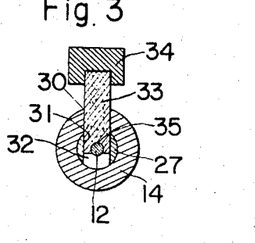
FIG. 3 is a cross-sectional view taken along the line III—III in FIG. 2.
Figure 4:
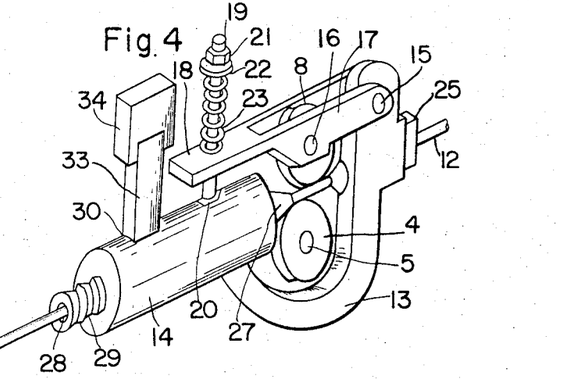
FIG. 4 is a perspective of FIG. 2.

The details of the electrode wire feeding device in which the features of the present invention reside is shown in FIG. 2 through FIG. 4 on an enlarged scale as broadly comprising the electrode wire drawing mechanism and the lubricant feeder.

Referring particularly to FIG. 2 through FIG. 4, the electrode wire drawing mechanism 7 includes a clamp structure 13 of an inverted J having its first end integrally connected with a cylinder 14 and its second end provided with pin 15 for pivotally bearing a support arm 17. This clamp structure 13 is rigidly fixed to a suitable chassis (not shown) in such a manner that the feeder roller 4 is positioned in a spacing half surrounded by a radially outwardly curved lower portion of the clamp structure 13. The pinch roller 8 rotatably carried by the support arm 17 at an intermediate portion of the arm by means of a shaft 16 is positioned above the feeder roller 4 with the electrode wire 12 sandwiched therebetween. The support arm 17 is formed at its free end 18 with a hole through which a stud bolt 19 is extended as will be mentioned later.

This stud bolt 19 has its one end rigidly engaged in the cylinder at 20 and its other end threaded with a nut 21 while a washer 22 and a compression spring 23 are interposed between the nut 21 and the free end 18 of the support arm 17 as shown, whereby the value of a pinching force of the pinch roller 8 with respect to the feeder roller 4 can be controlled by turning the nut 21 up or down.

The clamp structure 13 is formed at a position adjacent to the bearing pin 15 with a bore 24 in which a mouthpiece 25 formed with a longitudinally extending passage 26 is rigidly inserted in such a manner that the axis of the passage 26 is in substantially aligned relation with that of a passage 28 longitudinally formed in an elongated mouthpiece 27 rigidly inserted in the cylinder 14. The opposed ends of these mouthpieces 25 and 27 are tapered towards each other and the spacing therebetween must be preferably as small as possible with respect to either of the rollers 4 or 8 in order to minimize the possibility of the electrode wire departing from its normal passage. The elongated mouthpiece 27 has a threaded end 29 projecting from the cylinder 14, to which the threaded end 29 is connected to the guide tube 11 through a suitable coupling.

The lubricant feeder generally indicated by 9 in FIG. 1 is, in the instance as shown in FIG. 2 through FIG. 4, formed by a cavity 32 consisting of an opening 30 formed in an upper portion of the cylinder 14 and a through hole 31 formed in the elongated mouthpiece 27 in register with the opening 30 and at right angles to the axially extending hollow of the cylinder 14. In the cavity 32, a solid lubricant 33 is inserted with its lower end in contact with the electrode wire 12 extending through the longated mouthpiece 27 while the other end is loaded with a weight 34. However, it should be noted that the shape of the cavity 32 should coincide with the cross-section of the solid lubricant employed.

The solid lubricant 33 which may be employed in the electrode wire feeding device of the present invention is preferably in the form of a rectangular rod and should be such that, when friction occurs between the solid lubricant 33 and the electrode wire 12 moving in the direction of the welding torch 11, it can be finely pulverized under such friction within the cavity 32 consisting of the opening 30 and the through hole 31. Accordingly, the solid lubricant 33 is preferably made of graphite, molybdenum disulfide or a mixture of these compounds coagulated with the use of a suitable binder.

More specifically, according to the present invention, the solid lubricant 33 can be prepared with approximately 19 percent of powdery molybdenum disulfide and approximately 79 percent of powdery carbon, these powdery compounds being coagulated with the use of a minor amount, approximately 2 percent or so, of a binder of eopsy resin.

Prior to the insertion of the solid lubricant 33 in the cavity 32, it is preferable to form, on the contact surface of the lubricant 33, a grove 35 of the width substantially equal to the diameter of the electrode wire 12, the depth of which being equal to at least one half of said diameter, so that one half or more of the peripheral surface of the electrode wire 12 may be covered with the solid lubricant 33.

In this arrangement, as the electrode wire 12 is drawn in the direction of the welding torch 10 through the passage 26 and then the passage 28 by the electrode wire drawing mechanism composed of the feeder roller 4 and the pinch roller 8, friction takes place between the groove 35 of the solid lubricant 33 and the moving electrode wire 12. Under such friction, the lubricant 33 can be worn away, sticking to the peripheral surface of the electrode wire so that, when the electrode wire is passed through the guide tube 11, it can be smoothly moved therethrough with substantial reduction of the value of the frictional resistance that may imposed between the inner peripheral surface of the guide tube 11 and the peripheral surface of the electrode wire 12.

At this time, if the value of the contact pressure which is hereinafter defined as exerted between the lubricant 33 and the electrode wire 12 is assumed to be constant, the amount of wear of the solid lubricant depends upon the electrode wire drawing speed. Thus, it will be understood that the amount of the wear can be maintained at a constant value per unit length of the electrode wire and, therefore, the pulverized lubricant can be supplied in a constant rate over the peripheral surface of the electrode wire 12 throughout the welding operation. In order to adjust the value of the contact pressure, it is merely necessary to change the weight of the weight 34.

Although in the embodiment shown in FIG. 2 through FIG. 4 the weight 34 has been employed to control the value of the contact pressure, i.e., as means for controlling the contact pressure, it can be easily contemplated to use a combination of an elastic member with adjustable cover means as shown in FIG. 5 through FIG. 8, instead of the use of the weight 34.

Figure 5:
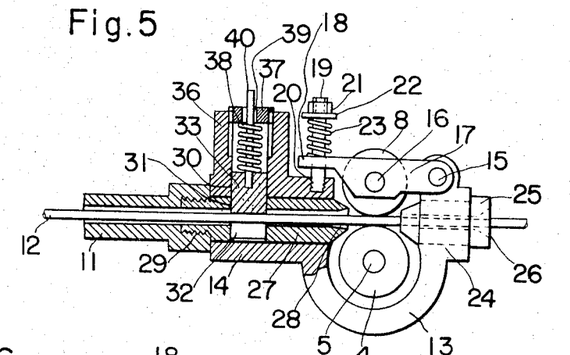
FIG. 5 is a view similar to FIG. 2, showing a second embodiment of the present invention.

In FIG. 5, the cylinder 14 is formed at its upper portion with a hollow lubricant enclosure 36 situated just above the cavity 32, the shape of the hollow of the enclosure 36 being coincident with the cross-section of the solid lubricant employed. This hollow enclosure 36 is provided at an upper portion of the inner peripheral surface with a threaded portion for receiving therein an adjustable cover 37 having a centrally disposed opening 39. Within the hollow enclosure 36, an elastic member 38, for example, in the form of an compression spring, is interposed between the solid lubricant 33 and the adjustable cover 37 so that the value of the contact pressure can be controlled through the elastic member 38 by turning the adjustable cover 37 up or down.

Reference numeral 40 is an elongated bar, one end of which is rigidly engaged in the adjacent end of the solid lubricant 33 while the other end extends through the opening 39 formed in the adjustable cover 37. This elongated bar 40 acts as a disengaging means for removing the lubricant out of the enclosure 36 when the lubricant wears away or temporarily maintaining the lubricant clear of the contact with the electrode wire. In the arrangement shown in FIG. 5, a fine adjustment of the contact pressure can be advantageously appreciated with substantial reduction of the possible overall weight of the electrode wire feeding device of the type hereinbefore and hereinafter referred to.

Figure 6:
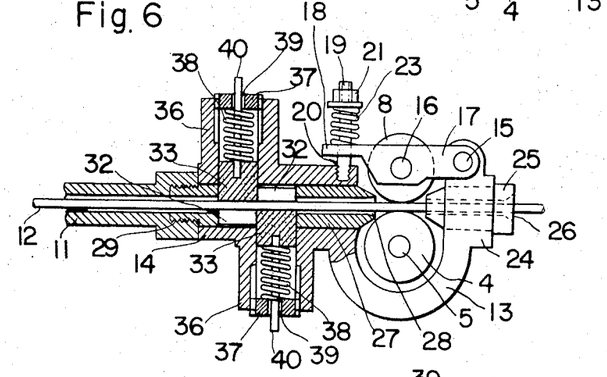
FIG. 6 is a view similar to FIG. 2, showing a third embodiment of the present invention.
Figure 7:
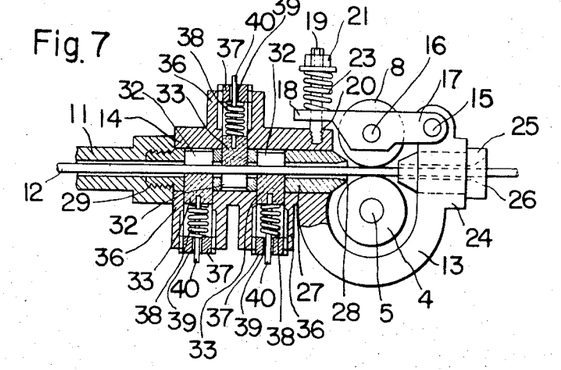
FIG. 7 is a view similar to FIG. 2, showing a fourth embodiment of the present invention.

However, this embodiment shown in FIG. 5 can be modified such as shown in FIGS. 6 and 7 wherein a plurality of the lubricant feeders consisting of the hollow enclosure 36, the adjustable cover 37 and the elastic member 38 are provided on both sides with respect to the cylinder 14, whereby the whole peripheral surface of the electrode wire 12 can be covered by lubricant. In other words, in the embodiments shown in FIGS. 6 and 7, two and three lubricant feeders are provided respectively. Each of these lubricant feeders shown in FIGS. 6 and 7 is constructed in the same manner as shown in FIG. 5 and, therefore, the details thereof are herein omitted. However, it should be noted that it is not always necessary to dispose the two or three feeders in the symmetrical relation to each other with respect to the transverse line at right angles to the axis of the cylinder 14, but can be displaced with respect to each other in the radial direction of the cylinder.

Figure 8:
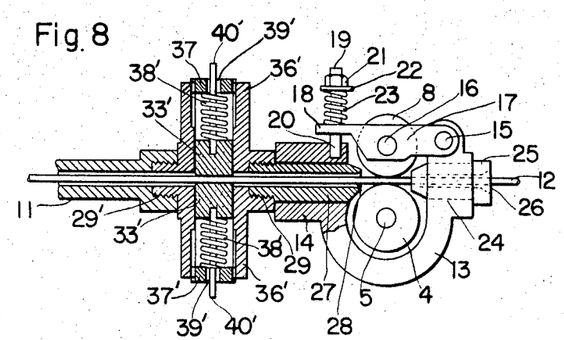
FIG. 8 is a side view of a lubricant feeder independent of the electrode wire drawing mechanism according to the present invention.

Especially, the feeder structure shown in FIG. 6 can be separated from the electrode wire drawing mechanism such as shown in FIG. 8. However, in FIG. 8, the lubricant feeder structure is connected to the threaded end 29 and an equivalent to the elongated mouthpiece 27 is omitted. For receiving a coupling connected with the adjacent end of the guide tube 11, a threaded projection 29' is provided. It is noted that the like parts of the device with respect to that shown in FIG. 6 are designated by like numerals having a prime.

Figure 9:
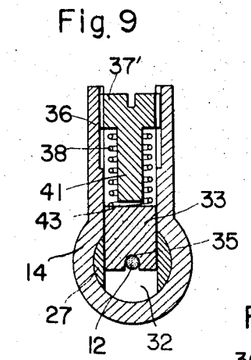
FIG. 9 is a cross-sectional view of the lubricant feeder incorporated with means for compensating the reduction of the contact pressure incident to the excessive wear of the solid lubricant.
Figure 10:
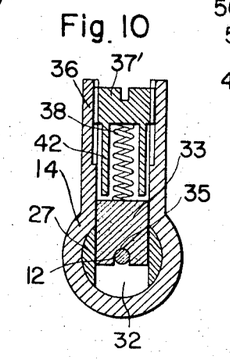
FIG. 10 is a view similar to FIG. 9, showing a modified form of said compensating means.
Figure 11:
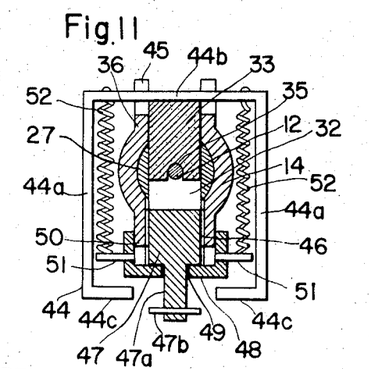
FIG. 11 is a view similar to FIG. 9, showing a further modified form of said compensating means.

The contact pressure controlling means consisting of a combination of the elastic member with the adjustable cover which has been employed in the device shown in FIGS. 5 through 8 may be modified such as shown in FIGS. 9 through 11 to provide means for compensating for the reduction of the contact pressure resulting from the increase of a gap between the solid lubricant and the adjustable cover incident to the excessive wear of the solid lubricant, in addition to the contact pressure controlling means.

In FIG. 9, the adjustable cover 37' is integrally formed at its undersurface with a column 41. When the adjustable cover 37' is inserted in the hollow of the enclosure 36, the column 41 integral with the cover 37' atop the column is surrounded by the elastic member 38 with its lower end in contact with the upper end of the solid lubricant 33.

In FIG. 10, instead of the column 41 shown in FIG. 9, a hollow column 42 is integrally provided in the adjustable cover 37. When this adjustable cover 37' is threaded into the hollow of the enclosure 36, the elastic member 38 of which the diameter is, in this instance, smaller than that shown in FIG. 9 is accommodated in the hollow portion defined by the column 42 and the undersurface of the adjustable cover 37'.

In either case, if the adjustable cover 37 is turned down, i.e., threaded into the hollow of the enclosure 36, to an extent that the column 41 or 42 is excessively contacted to the upper end of the solid lubricant 33, the value of the contact pressure will be greater than merely imposed by the elastic member and, accordingly, the pulverized lubricant will be supplied into the cavity 32 in an excessive amount for a certain period of time. After such period of time, a gap 43 will be gradually formed between the column 41 or 42 and the upper end of the solid lubricant 33 as the latter is further worn away in sliding contact with the moving electrode wire 12.

According to experiments conducted, the value of such period of time has been found to be in the range of from 2 to 3 minutes and, therefore, such excessive supply of the pulverized lubricant can be practically negligible as compared with the insufficient supply thereof. However, in the case where such supply should be strictly regulated a gap 43 should be preferably formed between the column 41 or 42 and the upper end of the solid lubricant. This can be simply made by turning up the adjustable cover 37' a certain angle of rotation, preferably 180°, after the adjustable cover 37 has been threaded into the hollow of the enclosure 36 until the lower end of the column 41 or 42 is contacted to the upper end of the solid lubricant.

It is noted that, in the case where the elastic member 38 is employed in the form of a compression spring, such compression spring should preferably have a large number of coils, that is a small spring constant, so that the value of the contact pressure can be controlled by means of sufficiently large variation of the free height of such compression spring with respect to the height thereof during the operation, i.e., under the compressed condition. By this provision, the value of a pressing force exerted by the compression spring can be substantially constantly maintained throughout the operation even if a certain amount of the solid lubricant wears away. Thus, it will be understood that the contact pressure can be maintained at an approximately constant value throughout the operation.

In FIG. 11, the cylinder 14 is formed at an upper portion with the hollow enclosure 36 having a pair of opposed grooves 45 and at an lower portion with a hollow projection 50 of similar construction to the enclosure 36. A four-cornered strip member 44 having a pair of vertical sections 44a, a transverse section 44b and a pair of transverse arms 44c as shown is suspended over in a pair of the opposed grooves 45 through its transverse section 44b. The lower hollow projection 50 is provided on its inner peripheral surface with a thread 46 for receiving therein an adjustable member 47 having a stud 47a and a handle 47b. The stud 47a of said adjustable member 47 extends through an opening 49 centrally formed in a cap-like member 48 which slidably cover a lower portion of the hollow projection 50.

This cap-like member 48 is formed at its flanged portion with a pair of wing-like members 51. A pair of tension springs 52 are respectively suspended between the transverse section 44b of the four-cornered strip member 44 and the wing-like members 51 so that the solid lubricant 33 can be always downwardly pressed by the pair of tension springs 52 through the transverse section 44b. The composite tension of the tension springs 52 can be adjusted by moving the cap-like member 48 in the vertical direction. This can be done by turning the handle 47b, i.e. turning the adjustable member 47 up or down within the hollow of the lower projection 50.

In operation, the value of the contact pressure can be constantly maintained by turning the adjustable member up so long as a clearance remains between the undersurface of the cap-like member 47 and the transverse arms 44c to which the cap-like member 47 may be restricted when the latter is fully turned up.

It will thus be understood that the tension springs 52 have a tendency to pull the transverse section 44b, i.e. the four-cornered strip member 42, so that the solid lubricant 33 can be downwardly pressed resulting in the supply of a predetermined amount of the pulverized lubricant under friction between the moving electrode wire 12 and the groove 35 of the solid lubricant.

Several repeated experiments conducted in connection with the electrode wire feeding device provided with the lubricant feeder of the arrangement shown in FIG. 11 with the use of 10 kg of flux cored wire, 3.2 mm in diameter, wound on the supply reel 6 (shown in FIG. 1) have proved that, once the value of the contact pressure was set at 1 kg/cm$^2$ prior to the commencement of the operation, the smooth movement of the electrode wire within the hollow guide tube on to the welding torch could be maintained until the terminating end of the coiled electrode wire passed through the electrode wire feeding device. At this time, the solid lubricant made of molybdenum disulfide and carbon according to the present invention, the size of which being 10 mm in width, 10 mm. in depth and 40 mm. in height, was employed. The hardness of the solid lubricant is roughly equivalent to that of a brush generally used in an electric motor for supplying current to the armature, but it is easily pulverized under friction.

By this arrangement shown in any one of FIGS. 9 through 11, it can be appreciated that the above mentioned contact pressure can be maintained at the predetermined value in a substantially simple manner irrespective of the size of the solid lubricant employed.

According to the present invention, there is also provided means for temporarily maintaining the solid lubricant clear of the contact with the electrode wire, whereby the lubricant replacement procedure can be easily performed without being hampered by the solid lubricant closing the cavity 32 at the time the terminating end of the electrode wire drawn from the reel passes beyond the lubricant feeder.

After the electrode wire has been completely fed beyond the electrode wire feeding device, particularly, the lubricant feeder, unless the means for temporarily maintaining the solid lubricant clear of the contact with the electrode wire is provided, the solid lubricant imposed with a pressure acting thereon to move the lubricant in the direction of the passage of the electrode wire, the lubricant will block the passage resulting in that not only the worn lubricant cannot be easily replaced with a new one, but also the leading end of a new length of electrode wire cannot be easily passed through the passage at the commencement of subsequently performed operation.

Figure 12:
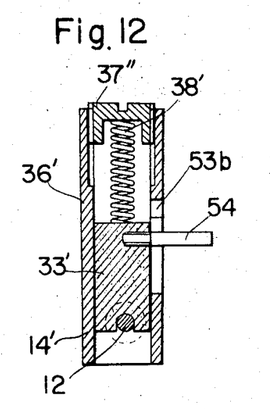
FIG. 12 is a front view of the lubricant feeder incorporated with means for disengaging the solid lubricant from its contact to the electrode wire.
Figure 13:
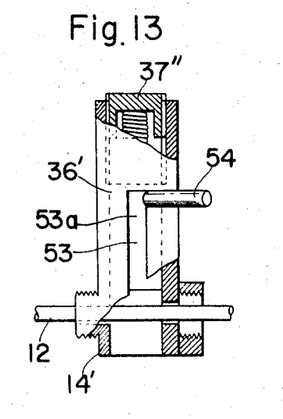
FIG. 13 is a side view of FIG. 12.
Figure 14A:
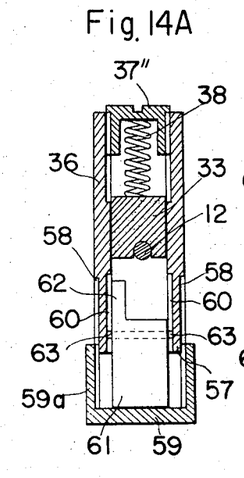
FIG. 14 is a view showing the lubricant feeder incorporated with a modified form of means for disengaging the solid lubricant from its contact to the electrode wire, wherein each Figure marked (A) shows said disengaging means in the released position while that marked (B) in the operated position.
Figure 14B:
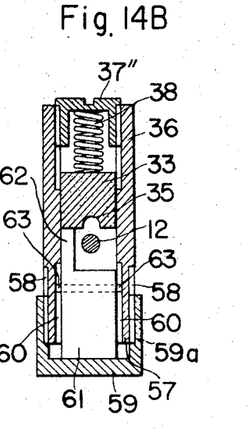

Before the description proceeds in connection with the disengaging means, it should be noted that the arrangements shown in FIGS. 12 through 14 are particularly applicable to the device shown in FIG. 8 while that shown in FIGS. 12 and 13 to the devices shown in FIGS. 5 through 7.

In FIGS. 12 and 13, the enclosure 36 is provided on its wall portion with an opening 53 of an inverted and backward L having a vertical section 53a and an engaging section 53b. A pin 54 of suitable length is rigidly engaged at its one end with an upper portion of the solid lubricant 33. In this arrangement, by upwardly pulling the free end of the pin 54 and then engaging it in the engaging section 53b of the opening 53, the solid lubricant 33 can be simply cleared off the cavity 32 to permit the insertion of a fresh length of the electrode wire therethrough. Such condition is clearly shown in FIG. 13.

In FIG. 14, the outer peripheral surface of a lower hollow projection 57 is formed with a thread 58 for receiving a cap-like member 59 having a flanged portion 59a while the inner peripheral surface thereof is formed with a pair of opposed grooves 60. A bushing 61 having a projection 62 is inserted in the hollow of the lower hollow projection 57, the bottom of which being mounted on the cap-like member 59 as shown. This bushing 61 is provided on both its sides with a pair of pins 63 each slidably engaged in the corresponding groove 60. In this arrangement, as the cap-like member 59 is turned down, the bushing 61 can be upwardly moved while guided by the grooves 60 through the respective pins 63 and, finally, an upper end of the projection 62 will push the solid lubricant 33 upwards. Accordingly, it will be understood that the solid lubricant 33 can be cleared of the contact with the electrode wire 12 as shown in FIG. 14 (B).

Figure 15A:
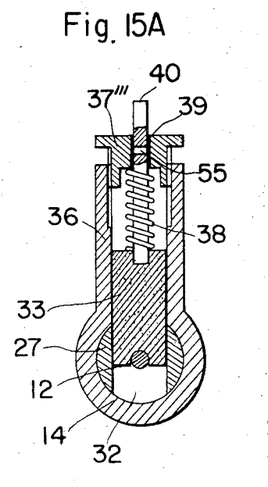
FIG. 15 is a view showing the lubricant feeder incorporated with a further modified form of means for disengaging the solid lubricant from its contact to the electrode wire, wherein each Figure marked (A) shows said disengaging means in the released position while that marked (B) in the operation position.
Figure 15B:
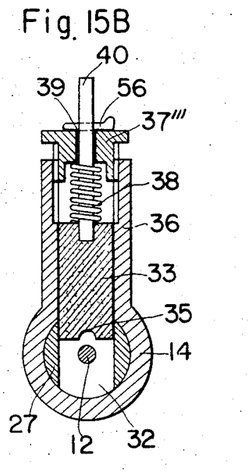

In FIG. 15, a through hole 55 is merely formed in the elongated bar 40 across the width of the bar. By this provision, when the elongated bar 40 is pulled upward against the elastic member 38, the solid lubricant can be maintained at the upwardly pulled position by inserting a rigid piece 56 through the through hole 55.

Figure 16A:
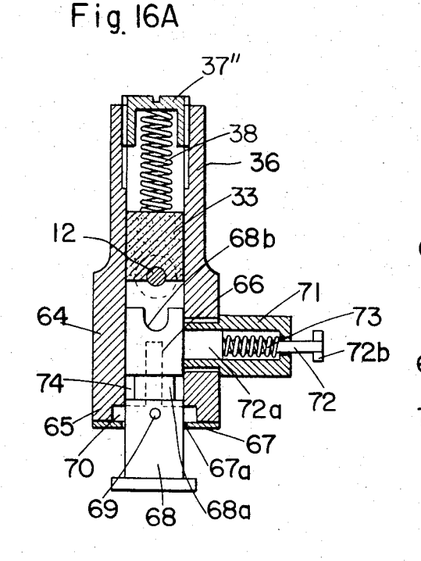
FIG. 16 is a view showing the lubricant feeder incorporated with a still further modified form of means for disengaging the solid lubricant from its contact to the electrode wire, wherein each Figure marked (A) shows said disengaging means in the released position while that marked (B) in the operated position.

In FIG. 16, the lower hollow projection 64 is formed at its lowermost extremity with a rim portion 65 and a guide recess 66 as shown by the dotted line. Fitted to the rim portion 65 is a stopper plate 67 having a central opening 67a of the shape coincident with the cross-section of the hollow of the lower projection 64. Reference numeral 68 represents a piston-like presser having a reduced diameter portion 68a at an intermediate portion thereof, one end of the piston-like presser being formed with a recessed portion 68b for receiving therein the electrode wire 12 drawn by the wire drawing mechanism 7 shown in FIG. 1 while the other end thereof being projected to the exterior through the central opening 67a. A pin 69 is rigidly secured to the piston-like presser 68 at a position below the reduced diameter portion 68a as shown and projecting in the direction parallel to the lengthwise direction of the recessed portion 68b. When this presser 68 is in the pulled position as shown in FIG. 16 (A), the pin 69 can be accommodated in a notched portion 70 formed by the lower extremity of the hollow projection 57' and the rim portion 65.

The lower hollow projection 64 is also formed at its lateral side with a casing 71 for enclosing a stopper rod 72, one end of the stopper rod 72 being integrally connected with an engaging head 72a while the other end is formed into a knob 72b. This stopper rod 72 is slidably extended in the hollow of the casing 72, but normally urged to the left by means of a compression spring 73 interposed between the right-hand end of the engaging head 72a and a flanged portion of the casing 71.

Figure 16B:
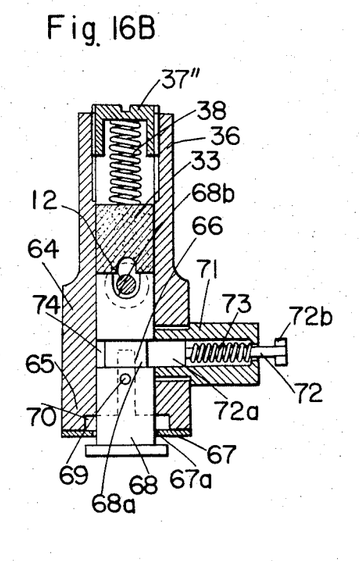

In operation, when the solid lubricant 33 is intended to be upwardly moved thereby to be clear of contact with the electrode wire 12, this can be achieved merely by upwardly pressing the piston-like presser 68 while the pin 69 is in register with the guide recess 66. An arbitrary downward movement of the piston-like presser 68 can be reliably restricted by the engaging head 72a of the stopper rod 72 engaging in an annular cavity 74 defined by the reduced diameter portion 68a and the inner wall of the projection 64. At this time, the solid lubricant 33 can be moved upwardly against the elastic member 38 by the presser 68 while the electrode wire 12 is loosely accommodated in the recessed portion 68b and thus the condition shown in FIG. 16(B) is established. On the contrary, when the solid lubricant 33 is to be engaged with the moving electrode wire 12, it is only necessary to pull the stopper rod 72 to the right.

It is noted that the arrangement shown in FIG. 14 or FIG. 16 can be advantageously applied where the solid lubricant employed is somewhat fragile. In addition, if the cap member 59 shown in FIG. 14 or the stopper plate 67 shown in FIG. 15 is removed, it will be understood that replacement of the solid lubricant can also be performed from a lower portion of the electrode wire feeding device proper unless the terminating end of the electrode wire has completely passed through the feeding device.

Although the present invention has been fully described in connection with the welding machine, it should be noted that the present invention can be applicable in any industry where a wire drawing mechanism is necessitated.

I, therefore, do not wish to be limited to the details shown and described herein, but intend to cover all such changes and modifications as are encompassed by the scope of the present invention.

What is claimed is:

1. In a wire feeding device provided with a wire drawing mechanism including a clamp structure and cylinder means adapted to feed a wire therethrough from a supply reel to the objective through a length of hollow guide tubing, said wire drawing mechanism comprising at least one lubricant feeder including a cavity formed in said cylinder means, an enclosure integrally formed with said cylinder means above said cavity and positioned between said clamp structure and the adjacent end of said hollow guide tubing, a cover member adjustably engaged in an opening of said enclosure, a solid lubricant inserted in said enclosure with its leading end contacted with the wire movable in the cylinder means by said wire drawing mechanism in the lengthwise direction, a contact pressure controlling means housed in said enclosure for adjusting the value of the contact pressure exerted between said leading end of the solid lubricant and the moving wire, whereby said solid lubricant has a tendency to be finely pulverized under friction in contact with said moving wire and then to stick over the peripheral surface of said wire to permit the latter to smoothly move in the hollow guide tubing with substantial reduction of the frictional resistance between the inner peripheral surface of said tubing and the peripheral surface of said wire, and means for disengaging the solid lubricant from its contact to the wire in the cylinder means, said disengaging means including a hollow projection integrally formed with the cylinder means at a position opposite to the lubricant feeder, a cap-like member adjustably covering an opening of said projection, said hollow projection being formed on its inner surface with at least one guide groove at a portion adjacent to said opening of said projection, a bushing having a projected presser integrally extended therefrom, and a pin member having at least one end extending from said bushing and slidably engaged in said guide groove, the bushing with the integral presser being movable upon rotation of said cap-like member between an advanced position in which said lubricant is disengaged from the contact with the wire by said presser and a retracted position in which said lubricant contacts the wire.

2. A wire feeding device as defined in claim 1, wherein two guide grooves are provided on the inner surface of said hollow projection and each end of the pin member extends from said bushing and slidably engages in a respective one of said guide grooves.

3. A wire feeding device as defined in claim 1, wherein said contact pressure controlling means is an elastic member housed in said enclosure between the cover member and the other end of the solid lubricant to urge the latter in the direction of the moving wire.

4. A wire feeding device as defined in claim 3, wherein each of said lubricant feeders includes means for compensating the reduction of the contact pressure incident to the excessive wear of the solid lubricant.

5. A wire feeding device as defined in claim 4, wherein said compensating means includes a hollow elongated member having one end integrally formed with said cover member, said elongated member being disposed within said enclosure and surrounding said elastic member.

6. A wire feeding device as defined in claim 4, wherein said compensating means includes an elongated member having one end integrally formed with said cover member, said elongated member being disposed within said enclosure and being surrounded by said elastic member.

7. In a wire feeding device provided with a wire drawing mechanism including a clamp structure and cylinder means adapted to feed a wire therethrough from a supply reel to the objective through a length of hollow guide tubing, said wire drawing mechanism comprising at least one lubricant feeder including a cavity formed in said cylinder means, an enclosure integrally formed with said cylinder means above said cavity and positioned between said clamp structure and the adjacent end of said hollow guide tubing, a cover member adjustably engaged in an opening of said enclosure, a solid lubricant inserted in said enclosure with its leading end contacted with the wire movable in the cylinder means by said wire drawing mechanism in the lengthwise direction, a contact pressure controlling means housed in said enclosure for adjusting the value of the contact pressure exerted between said leading end of the solid lubricant and the moving wire, whereby said solid lubricant has a tendency to be finely pulverized under friction in contact with said moving wire and then to stick over the peripheral surface of said wire to permit the latter to smoothly move in the hollow guide tubing with substantial reduction of the frictional resistance between the inner peripheral surface of said tubing and the peripheral surface of said wire, and means for disengaging the solid lubricant from its contact to the wire in the cylinder means, said disengaging means including a hollow projection integrally formed with the cylinder means at a position opposite to the lubricant feeder, a piston-like presser slidably accommodated in said hollow projection and formed at its intermediate portion with a reduced diameter portion, a casing connected with a lateral side of said hollow projection and a stopper rod slidably accommodated within said casing, one end of said stopper rod being integrally connected with an engaging head and the other end being formed into a knob, said stopper rod being constantly urged toward the piston-like presser by means of a spring, whereby when the piston-like presser is pressed toward the solid lubricant the stopper rod will engage in an annular cavity defined by the reduced diameter portion thereby to maintain said presser in the operated position in which the solid lubricant is disengaged from its contact to the moving wire.

8. A wire feeding device as defined in claim 7, wherein said lubricant feeder includes means for compensating the reduction of the contact pressure incident to the excessive wear of the solid lubricant.

9. A wire feeding device as defined in claim 8, wherein said compensating means comprises an elongated member integrally formed with said cover member, said elongated member being disposed within said enclosure.

10. A wire feeding device as defined in claim 7, wherein said cylinder means comprises a first cylinder integrally formed with said clamp structure and a second cylinder having said lubricant feeder integrally formed therewith, said second cylinder adapted to be connected between said first cylinder and the adjacent end of the hollow guide tubing.

11. A wire feeding device as defined in claim 7, wherein said contact pressure controlling means is an elastic member housed in said enclosure between the cover member and the other end of the solid lubricant to urge the latter in the direction of the moving wire.

* * * * *